United States Patent [19]
Krueger

[11] 3,744,306
[45] July 10, 1973

[54] METHOD AND APPARATUS FOR MEASURING THE ULLAGE OF A VESSEL

[76] Inventor: Rudolph E. Krueger, 1201 Dolphin Terrace, Corona Del Mar, Calif. 92625

[22] Filed: June 30, 1972

[21] Appl. No.: 267,917

[52] U.S. Cl. .................................................. 73/149
[51] Int. Cl. ............................................. G01f 17/00
[58] Field of Search .............................. 73/149, 302

[56] References Cited
UNITED STATES PATENTS
3,059,469   10/1962   Caldwell .............................. 73/149

*Primary Examiner*—Donald O. Woodiel
*Attorney*—Robert L. Parker, M. Roy Spielman et al.

[57] ABSTRACT

There is described a system for indicating the remaining volume or ullage of a fully enclosed tank or other vessel in which the vessel is pressurized above atmospheric pressure and the air then permitted to discharge from the tank at a substantially constant rate. The time required for the pressure to drop from a first level to a second level of pressure provides an indication of the free volume in the tank.

14 Claims, 3 Drawing Figures

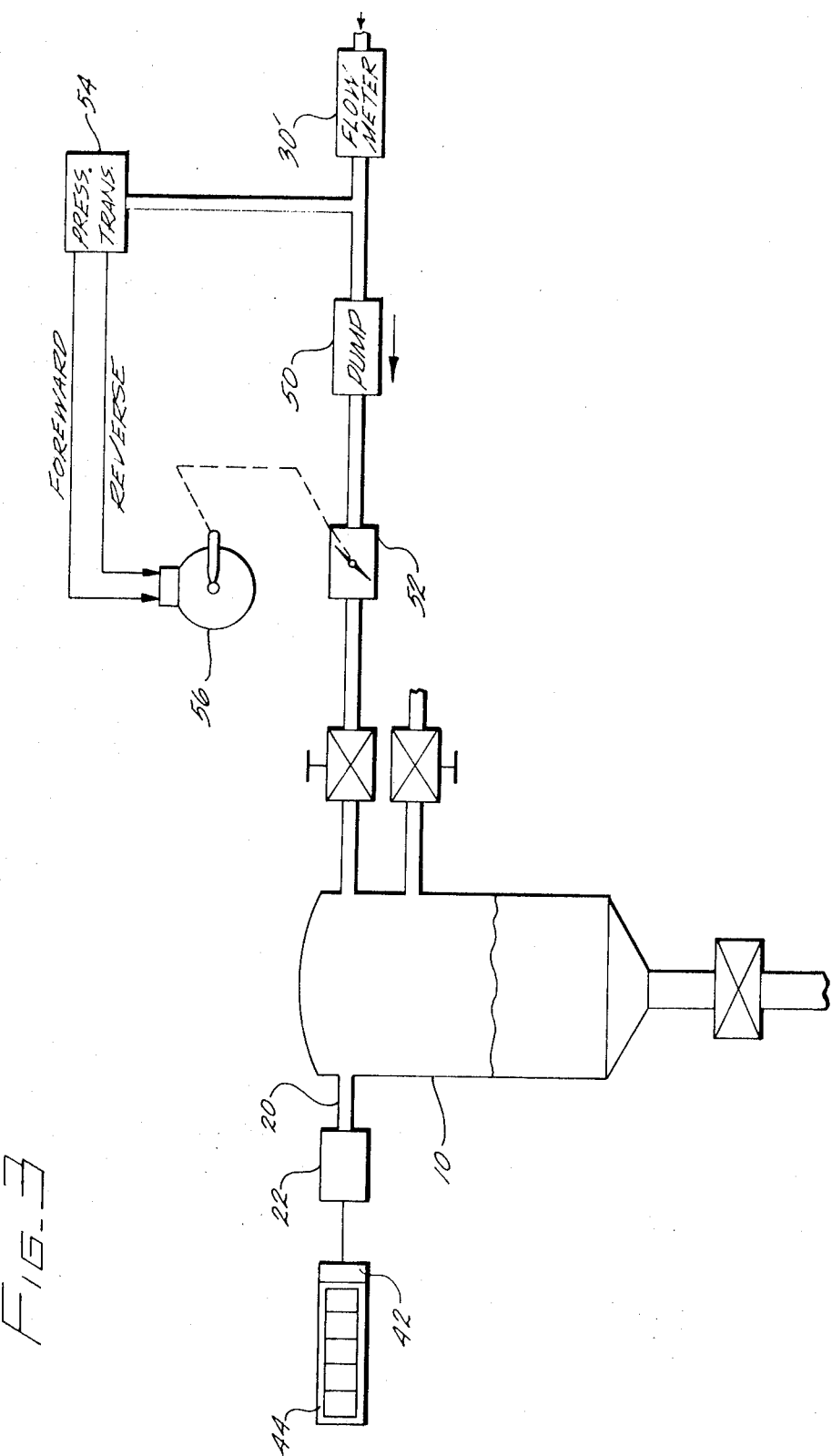

METHOD AND APPARATUS FOR MEASURING THE ULLAGE OF A VESSEL

FIELD OF THE INVENTION

This invention relates to a volume-measurement system, and more particularly is conerned with measuring the free volume or ullage of a container for storing solid materials.

BACKGROUND OF THE INVENTION

The measurement of fluid stored in a tank is well known. However, the usual methods of measuring liquids in a storage tank or the like are not always applicable where dry materials, such as cement or other finely divided solid materials, are being stored. Because such dry materials do not seek a "level" as does a liquid, the use of level-type gages, sounding by means of a weighted line, tapping the outside of the tank with a hammer, or other conventional means of determining how much material remains in the tank, become too inaccurate for many applications.

Where a more accurate method of determining the amount of such dry material in a tank is required, it is common practice to install weighing means for determining the weight of material stored in the tank from which the volume of material can be calculated. Weighing methods have the disadvantage that the tank must be free of any constraints which would affect the weighing measurements. Even though flexible connections to the tanks may by provided, the stiffness of these connections and therefore the restraint on the tank may vary with temperature changes or other ambient conditions.

The measuring of the contents of a tank has presented particular difficulties in the case of ships or other floating facilities. Here the constant movement of the ship presents problems either in determining the level of material in the tank or in weighing the tank. The weighing method is subject to errors due to shifting of the center of gravity of the tank mass and vertical and transverse accelerations resulting from the roll of the ship.

SUMMARY OF THE PRESENT INVENTION

In brief, the present invention provides a system for indirectly measuring the volume of a material stored in a tank by measuring the remaining free volume or ullage of the tank. This is accomplished in brief by pressurizing the tank above ambient pressure with air and allowing the air to escape through an orifice which maintains the discharge rate substantially constant over a limited pressure drop. By measuring the time required for the pressure to change some predetermined amount, the volume can be calculated, assuming the flow rate is known.

BRIEF DESCRIPTION OF THE DRAWINGS

For a more complete understanding of the invention, reference should be made to the accompanying drawings wherein:

FIG. 3 is a schematic diagram of an alternative embodiment of the apparatus.

DETAILED DESCRIPTION

Figure 1:
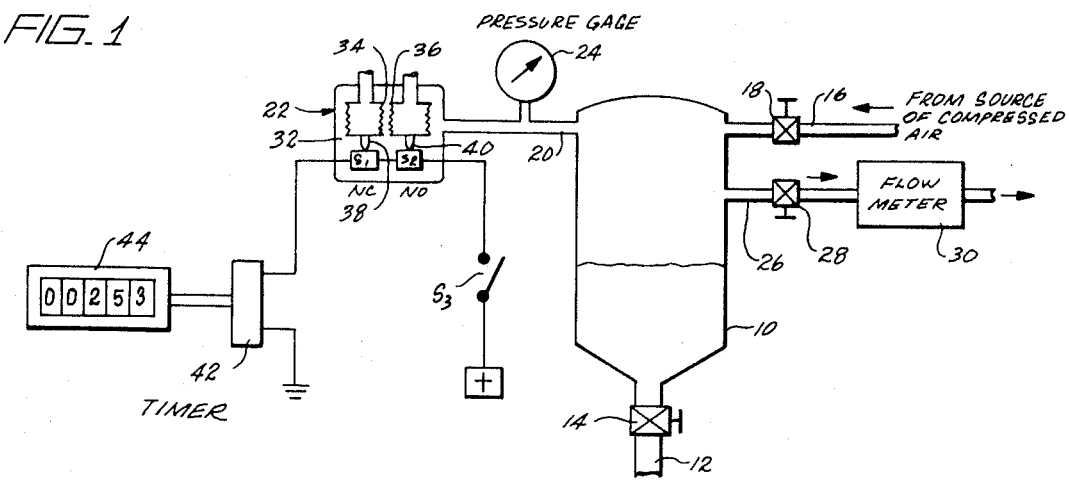
FIG. 1 is a schematic diagram of the apparatus.
Figure 2:
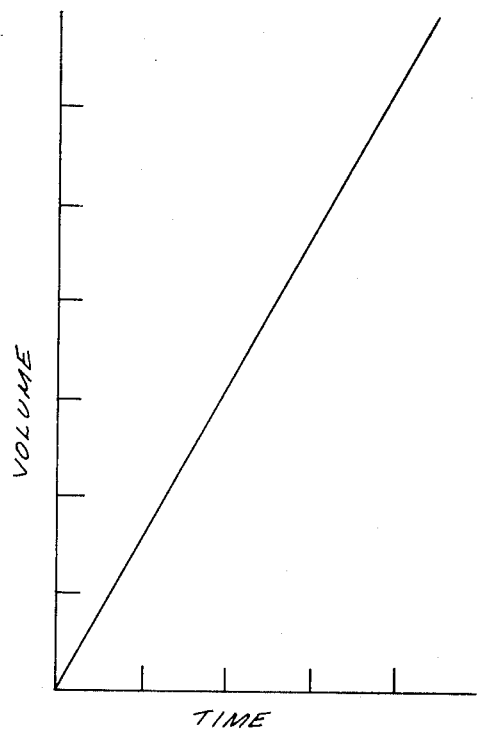
FIG. 2 is a graphical representation of the relation between measured time and ullage volume.

Referring to FIG. 1, the volume measuring apparatus is shown schematically. The numeral 10 indicates generally a tank or other closed vessel which is adapted to store materials either in the form of a liquid or a finely divided solid matter, such as dry cement for example. The tank 10 is fully enclosed and substantially air tight. It is preferably provided with an outlet 12 at the bottom controlled by a valve 14 through which the material stored in the tank is permitted to flow out of the tank as needed.

The upper end of the tank 10 is provided with an inlet line 16 connected through a valve 18 to a source of air under pressure. The tank is provided with a line 20 which connects to a pressure-sensing device 22 and a pressure gage 24. An output line 26 from the tank 10 provides a discharge path for the air through a valve 28 and flow meter 30 to the atmosphere.

The pressure-sensing unit 22 includes a sealed chamber 32 in which are mounted two bellows units 34 and 36. The interior of the bellows units are vented to atmosphere so that changes in pressure within the chamber 32 above ambient pressure causes the bellows to provide movement to actuator pins 38 and 40, respectively. Pin 38 operates a first switch $S_1$ having contacts which are normally closed until the pressure within the chamber 32 exceeds a pressure $P_1$. The pin 40 actuates a second switch $S_2$ having normally open contacts which are closed when the pressure within the chamber 32 exceeds a pressure $P_2$ which is less than the pressure $P_1$.

The switches $S_1$ and $S_2$ are connected in series with a manual switch $S_3$, the switches $S_1$, $S_2$, and $S_3$ when all closed providing a current path from one terminal of a potential source (not shown) through a timer motor 42. The timer motor preferably has a digital counter 44 associated therewith for counting in units of time, such as seconds, during which the timer motor 42 is actuated.

The flowmeter 30 may be any device suitable for providing a known constant flow rate of discharge of air from the tank. It may be simple non-adjustable Venturi where the operating ambient pressure and temperature are at nominal values. Where the system is to operate under a wide range of ambient pressure and temperature conditions, the flow meter may be a positive displacement gas meter, rotary-type flow meter, or other device by means of which the discharge rate can be adjusted to a predetermined rate commensurate with the calibration of the system.

In operation, to make a measurement of the ullage volume of the tank, the valve 18 is opened long enough to build the pressure in the tank up to some suitable pressure higher than the pressure $P_1$ at which the switch $S_1$ is actuated by the bellows 34. As a result the switch $S_1$ is open and the switch $S_2$ is closed due to the increased pressure in the chamber 32. After sufficient time to allow the pressures to equalize throughout the system, the switch $S_3$ is closed and the valve 28 is opened permitting the air to discharge through the flowmeter 30. This causes the pressure in the tank to start dropping back towards ambient pressure and when it drops to the level $P_1$, the switch $S_1$ again closes, completing a circuit through the timer motor 42. As the pressure continues to drop, when it reaches a level $P_2$, the switch $S_2$ is open thereby breaking the circuit to the timer motor 42. By proper calibration of the system, the time interval indicated by the timer is a direct indication of the ullage volume of the tank 10.

The time involved in dropping the pressure from $P_1$ to $P_2$ is determined by the discharge rate of the flow meter and the volume of air in the tank. The volume measurement according to the invention is based on the weight loss from an unknown volume. The weight of air per cubic foot is:

$$W/V = 1.325 \, (P/T) \tag{1}$$

when $P$ is the absolute pressure in inches of mercury and $T$ is the absolute temperature in degrees Rankine and $V$ is the ullage volume. Assuming a constant flow rate in dropping the pressure from $P_1$ to $P_2$ at constant temperature, the loss of air by weight is:

$$W_1 - W_2 = (1.325/I) \, V \, (P_1 - P_2) \tag{2}$$

where $W_1$ and $W_2$ are the weight of air in the unknown volume $V$ at pressure $P_1$ and $P_2$ respectively. The loss of weight is also given by the relation:

$$W_1 - W_2 = f \text{ (flowrate)} \times t \text{ (time)} \tag{3}$$

Combining equations (2) and (3) gives the relation:

$$V = I/1.325 \times f/P_1 - P_2 \times t = kt \tag{4}$$

A flow meter in the form of a fixed orifice may be used assuming that operation of the system is at ambient temperature and pressure. The flow rate f of an orifice is given by the relation $p \, v \, A$, where $p$ is the density of the air, $v$ is the velocity of the air through the orifice, and $A$ is the area of the orifice. The velocity v is determined by the average pressure drop across the orifice. The average pressure $(P_1 - P_2)/2$ is selected to provide an exit velocity of substantially less than Mach 1. This insures that the pressure at the outlet of the orifice is substantially at ambient pressure. The orifice size may be selected, for example, to provide a flow rate of approximately one cubic foot per second with a pressure drop from $P_1 = 39.65$ inches down to 35.88 inches of mercury absolute. This gives a value of the constant $k$ of approximately 10, so that one second of time represents approximately 10 cubic feet of ullage volume. The size of the orifice is selected such that the flow rate and therefore the time required to make the measurement is in a practical range, that is, so as to avoid measuring in fractions of a second on one hand and measuring over needlessly long periods of time at the other extreme. Calibration of the system can be most easily adjusted by varying the pressure settings of the pressure-sensing system.

While the invention has been described in terms of measuring the time for air or other gas to flow out of the tank and drop the pressure by a predetermined amount, the invention could be practiced by allowing air to flow into the tank at a known flow rate and measuring the time for the pressure to increase by a predetermined amount. This could be accomplished, for example, by connecting the line 16 of FIG. 1 to a vacuum pump by which the pressure in the tank could be initially lowered by several pounds of pressure below ambient. Air would then be allowed to flow into the flowmeter 30 to the tank and the time required for the pressure to rise in the tank by some incremental amount measured by the timer 42.

An alternative arrangement is shown in FIG. 3. In this arrangement, air is drawn in through a flowmeter 30' from an ambient air source by a pump 50. The pump 50 forces air into the tank at above ambient pressure through a throttle valve 52. The valve 18 is open and the valve 28 is closed during the measurement.

In order to insure a constant flow rate through the flow-meter 30', the pressure on the intake side of the pump 50 is regulated by means of the throttle valve 52 through a servo control system which includes a pressure-sensing transducer 54. The pressure-sensing transducer 54 operates a servo motor 56 which is connected to the throttle valve 52. By this arrangement, the pressure drop $\Delta P$ across the nozzle of the flowmeter 30' is kept constant. Thus by this arrangement, the time required for the pressure in the tank to increase by an incremental amount is proportional to the gas volume in the tank, that is, the ullage. It should be noted that since the pressure is increasing with time in the arrangement of FIG. 3, the switches $S_1$ and $S_2$ are arranged so that the normally open switch closes as the pressure increases above ambient to the first pressure level and the normally closed contact of the other switch is then opened at the higher pressure above ambient. In this way the timer 42 is turned on by the closing of the first switch and turned off by the opening of the second switch.

While the principle involved is identical in both the arrangement of FIG. 1 and the arrangement of FIG. 3, normally it is simpler to work with a pressure inside the tank that is higher than the pressure outside the tank. However, there are instances where the material within the tank may cause the air in the tank to be heavily contaminated with dust. This dust escapes with the air through the flowmeter nozzle during the test. The presence of large amounts of dust in the air passing through the orifice of the nozzle can affect the calibration of the measurement due to the resistance of the dust particles to the acceleration through the nozzle. In such case the arrangement of FIG. 3 may be preferable, since the movement of air is into the tank rather than out of the tank.

What is claimed is:

1. Apparatus for measuring ullage of a tank or other enclosed storage vessel comprising means connected to the tank for pressurizing the interior of the tank above ambient pressure with a gas, means connected to the tank for discharging the gas from the pressurized tank at a substantially constant flow rate, a timer, first pressure sensitive means connected to the tank for starting the timer when the pressure in the tank drops to a first pressure level, and second pressure sensitive means connected to the tank for stopping the timer when the pressure in the tank drops to a second pressure level lower than said first pressure level.

2. Apparatus of claim 1 wherein the gas discharging means is a nozzle having an orifice for controlling the rate of flow.

3. Apparatus of claim 1 wherein the gas discharge means is a flow meter device for regulating the rate of flow.

4. Apparatus of claim 1 wherein the first and second pressure sensitive means include switches, the switches being connected in circuit with the timer.

5. The method of measuring the ullage volume of a sealed container comprising the steps of:

pressurizing the container with a gas to a level above ambient, discharging the gas from the container at substantially constant rate between two levels of pressure in the container; and measuring the time interval for the pressure to go from the higher to the lower of said two levels of pressure.

6. The method of claim 5 further comprising the step of:

selecting the said two pressure levels such that the discharge velocity of the gas is substantially below the velocity of sound.

7. The method of measuring the volume of a confined space comprising the steps of:
 a. connecting the space to a source of gas at a different pressure than said confined space;
 b. permitting gas to flow between said space and said source at substantially constant flow rate; and
 c. measuring the time required for the pressure in the confined space to change between two fixed pressure levels.

8. The method of claim 7 wherein the source of gas is at a lower pressure than the gas in the confined space, the gas flowing from the higher pressure space into said lower pressure source.

9. The method of claim 7 wherein the source of gas is at a higher pressure than the gas in the confined space, the gas flowing from the higher pressure source into said lower pressure space.

10. The method of claim 7 including the step of maintaining said source at substantially constant pressure during said measuring time.

11. Apparatus for measuring ullage of a tank comprising:

means connected to the tank for flowing gas between the tank and a constant pressure source at a constant flow rate, means sensing when the gas pressure in the tank is at a first level, means sensing when the gas pressure in the tank is at a second level, and timing means controlled by said sensing means for measuring the time required for the pressure to change from one of said levels to the other of said levels.

12. Apparatus of claim 11 wherein said means for flowing gas includes orifice means for holding the flow rate constant, and means providing a pressure differential between the tank and the source for causing gas to move through the orifice.

13. Apparatus of claim 12 wherein said means providing a pressure differential includes means for initially pressurizing the tank to a higher pressure than the constant pressure source.

14. Apparatus of claim 12 wherein said means includes a pump connected between the tank and the orifice means for pumping gas into the tank through the orifice from the constant pressure source.

* * * * *